(12) United States Patent  
Diab

(10) Patent No.: US 8,416,774 B2  
(45) Date of Patent: Apr. 9, 2013

(54) METHOD AND SYSTEM FOR ENERGY-EFFICIENCY-BASED PACKET CLASSIFICATION

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 175 days.

(21) Appl. No.: 12/483,952

(22) Filed: Jun. 12, 2009

(65) Prior Publication Data

US 2010/0316049 A1    Dec. 16, 2010

(51) Int. Cl.
*H04L 12/28* (2006.01)
(52) U.S. Cl. .................... 370/389; 709/224
(58) Field of Classification Search .......... 370/389; 709/224
See application file for complete search history.

(56) References Cited

U.S. PATENT DOCUMENTS

| | | | |
|---|---|---|---|
| 7,099,934 B1 * | 8/2006 | Ewing et al. | 709/223 |
| 2005/0009578 A1 | 1/2005 | Liu | |
| 2006/0034295 A1 | 2/2006 | Cherukuri et al. | |
| 2007/0127581 A1 * | 6/2007 | Connor et al. | 375/257 |
| 2007/0280239 A1 | 12/2007 | Lund | |
| 2008/0225841 A1 | 9/2008 | Conway et al. | |
| 2009/0046611 A1 * | 2/2009 | Ryu et al. | 370/311 |
| 2009/0052327 A1 * | 2/2009 | Larsson et al. | 370/238 |
| 2009/0103456 A1 * | 4/2009 | Herrmann et al. | 370/254 |
| 2009/0248854 A1 * | 10/2009 | Conway | 709/224 |
| 2009/0291686 A1 * | 11/2009 | Alpert et al. | 455/436 |

FOREIGN PATENT DOCUMENTS

| | | |
|---|---|---|
| CN | 101388835 A | 3/2009 |
| EP | 1 473 870 | 11/2004 |
| EP | 1 484 876 | 12/2004 |
| EP | 1 494 407 | 1/2005 |
| EP | 2043311 | 4/2009 |
| GB | 2 337 672 | 11/1999 |
| GB | 2402580 | 12/2004 |
| WO | WO 00/31923 | 6/2000 |

OTHER PUBLICATIONS

Teener, "AudioNideo Bridging for Home Networks (IEEE 802.1 AV Bridging Task Group)" [Online] Jun. 1, 2007, http://www.ieee802.org/3/eee_study/public/jul07/teener_1_0707.pdf.
Grow, "802.1 and Energy Efficient Ethernet." Sep. 11, 2007, pp. 1-6, XP002509616.
Bennett et al., "Energy Efficient Ethernet." Jul. 16, 2007, pp. 1-70, XP002509615.
European Search Report, EP 10005648, Sep. 1, 2010.
Office Action from Chinese Patent Office, Dec. 19, 2011.
Gupta et al., "Dynamic Ethernet Link Shutdown for Energy Conservation on Ethernet Links." XP-002524616, pp. 6156-6161, 2007.
Wael Diab, "Energy Efficient Ethernet and 802.1." IEEE 802 Plenary, Nov. 16, 2007, XP-002524617.
Office Action from Chinese Patent Office, Nov. 5, 2012.

* cited by examiner

*Primary Examiner* — Robert Wilson
*Assistant Examiner* — Wei Zhao
(74) *Attorney, Agent, or Firm* — Duane S. Kobayashi

(57) ABSTRACT

Aspects of a method and system for energy-efficiency-based packet classification are provided. In this regard, a network link for communicating a packet may be selected based, at least in part, on an amount of energy required to communicate the packet over the network link, and based, at least in part, on an energy efficiency class to which the packet is assigned. The energy efficiency class may be determined based on one or more fields of the packet, wherein the fields may comprise one or more of an Ethertype field, a type of service header of an IP datagram, and a field pre-pended or appended to a payload of the packet. In this regard, during or subsequent to generation of the packet, the packet may be marked such that a network path traversed by the generated packet may be determined based on the energy required to communicate the packet over the network path.

16 Claims, 7 Drawing Sheets

METHOD AND SYSTEM FOR ENERGY-EFFICIENCY-BASED PACKET CLASSIFICATION

CROSS-REFERENCE TO RELATED APPLICATIONS/INCORPORATION BY REFERENCE

Not applicable.

FIELD OF THE INVENTION

Certain embodiments of the invention relate to networking. More specifically, certain embodiments of the invention relate to a method and system for energy-efficiency-based packet classification.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy-efficiency-based packet classification, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for energy-efficiency-based packet classification. In various embodiments of the invention, a network link for communicating a packet may be selected based, at least in part, on an amount of energy required to communicate the packet over the network link, and based, at least in part, on an energy efficiency class to which the packet is assigned. A time at which to transmit the packet over the link may be determined based on an amount of energy required to communicate the packet over the network link. Transmission of the packet may be deferred until the selected network link transitions to a lower energy mode of operation. Transmission of the packet may be deferred until the selected network link is available for communication of the packet. The energy efficiency class may be determined based on one or more fields of the packet, where the fields may comprise one or more of an Ethertype field, a type of service header of an IP datagram, and a field pre-pended or appended to a payload of the packet. In this regard, during or subsequent to generation of the packet, the packet may be marked such that a network path traversed by the generated packet may be determined based on the energy required to communicate the packet over the network path.

Figure 1:
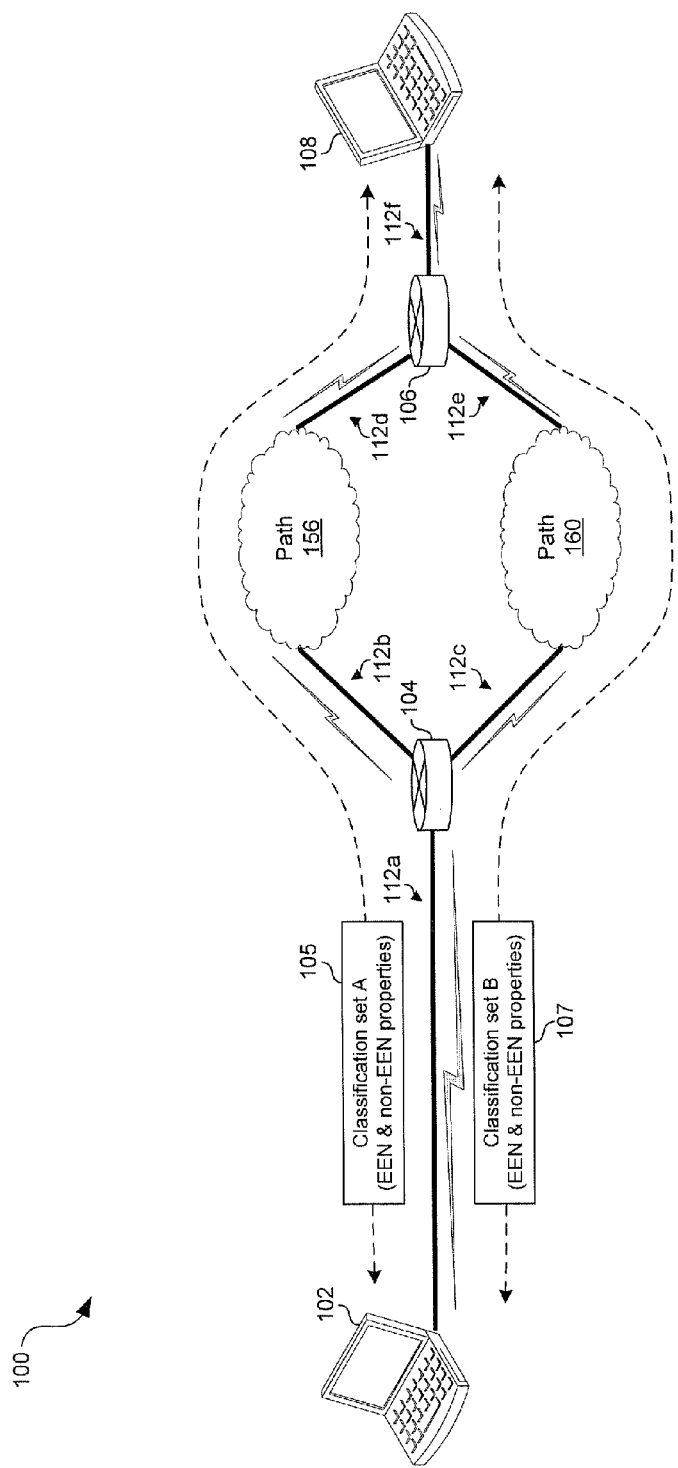
FIG. 1 is a diagram illustrating packets traversing a network based on an energy efficiency classification, in accordance with an embodiment of the invention.

FIG. 1 is a diagram illustrating packets traversing a network based on an energy efficiency classification, in accordance with an embodiment of the invention. Referring to FIG. 1 there is shown a network 100 comprising network devices 102, 104, 106, and 108 communicatively coupled via network links 112a-112e, a network path 156, and a network path 160.

The network devices 102, 104, 106, and 108 may each comprise suitable logic, circuitry, interfaces, and/or code that may be operable to communicate over a network. The network devices 102, 104, 106, and 108 may each comprise, for example, a switch, a router, a network controller, an endpoint, a computer system, audio/video (A/V) enabled equipment, or a combination thereof. A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data. Also, the network devices 102, 104, 106, and 108 may be operable to implement security protocols such IPsec and/or MACSec.

Each of the network links 112a-112e may comprise copper, wireless, optical, and/or backplane media. For example, a copper medium such as STP, Cat 3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media, single mode fiber as well as multi-mode fiber may be utilized. With regard to wireless communication, the network devices 102, 104, 106, and 108 may support one or more of the 802.11 family of protocols.

The network paths 156 and 160 may each comprise one or more links similar to the links 112 and/or one or more network devices similar to the network devices 102, 104, 106, and/or 108. The paths 156 and 160 may have different characteristics and thus may be differently suited for communicating different types and/or classifications of traffic. In this regard, packets communicated in the network 100 may be classified and the classifications may provide criteria for determining a network path over which the packet is communicated, where the path may include how, when, and where to send the packet. A packet may be classified based on, for example, required quality of service (QoS) with which the packet is to be delivered, latency that may be tolerated, packet jitter (variation in the amount of time between packets) that may be tolerated, maximum number of network hops over which the packet may travel, a VLAN to which the packet belongs, and amount of energy that may be expended to communicate the packet over a network hop and/or path.

With regard to classifying packets based on an amount of energy expended to communicate the packet across a network path, a packet may be marked as belonging to an energy efficiency class, and network devices may transmit and/or forward the packet based, at least in part, on the energy-efficiency class to which the packet belongs. In this regard, energy expended to communicate a packet over different paths may vary for a variety of reasons such as: different data rates being utilized, different signaling techniques being utilized, different physical media being utilizing, and/or differing support of energy efficient networking (EEN) protocols such as low power idle and/or subset PHY.

Packets may be classified into, for example, one of two energy efficiency classes. In such an embodiment, packets in a first energy efficiency class may be communicated based on energy consumption, and packets in the second energy efficiency class may be communicated without regard to energy consumption. Another possibility is that packets may be classified utilizing a plurality of energy efficiency classes. For example, three energy efficiency classes may be utilized and packets may be communicated (1) based only on energy required to deliver the packet, (2) based on energy consumption and one or more other criteria, or (3) based only on other criteria with no regard for energy required to deliver the packet. Packets may be classified into any number of energy efficiency classes without deviating from the scope of the invention.

Thus, a packet may be classified in on or more ways, with at least one of those classifications being based on energy efficiency, and a network path traversed by the packet may be determined by determining one or more classifications associated with the packet and forwarding and/or routing the packet along a path that most optimally balances the various classifications.

In operation, the network device 102 may exchange packets 105 and 107 with the network device 108. The packets 105 may comprise a first set of classifications referenced herein as "classification set A" and the packets 107 may comprise a second set of classifications referenced herein as "classification set B". In this regard, the network devices 102 and 108 may be operable to generate packets 105 and 107, and to tag, or otherwise mark, the packets 105 and 107 to indicate which energy efficiency class, and/or other classifications each packet is associated with.

The path 156 may comprise devices and/or hops determined to most optimally meet the criteria of classification set A for communicating the packets 105 between the devices 102 and 104. Similarly, the path 160 may comprise devices and/or hops determined to most optimally meet the criteria of classification set B for communicating the packets 107 between the devices 102 and 104. Accordingly, the network device 104 may be operable to inspect packets received from the network device 102 and determine a path along which to forward the packets. The packets 105 may be forwarded via path 156, and the packets 107 may be forwarded via path 160. Similarly, the network device 106 may be operable to inspect packets received from the network device 108 and determine a path along which to forward the packets. The packets 105 may be forwarded via the path 156, and the packets 107 may be forwarded via the path 160.

In an exemplary embodiment of the invention, the packets 105 may be classified as desiring low energy consumption, and being tolerant of high latency, whereas the packets 107 may be classified as having little regard for energy consumption but requiring very low latency. Accordingly, the network path 156 may be optimal for carrying traffic classified as requiring low latency but tolerant of high energy consumption, and the network path 160 may be optimal for traffic classified as requiring low energy consumption but tolerant of high latency. This exemplary embodiment in which there are two network paths each characterized based on energy and latency classification is for the purposes of illustration only; the invention is not limited with regard to the number of possible network paths that a packet may traverse or the type and/or number of classifications utilized in choosing an optimal path.

In some embodiments of the invention, characteristics of a network device or path may be dynamic and thus routing and/or forwarding of traffic may change or adapt accordingly. For example, energy efficiency of a device may increase when the data rate of that device or link is low, but may decrease as higher data rates are utilized. Similarly, latency may increase as a load on a device or link increases. In such instances, selecting a path with the appropriate characteristics may comprise waiting for one or more devices and/or links to switch from one set of characteristics, such as high energy and low latency, to another set of characteristics such as low energy and high latency.

Although FIG. 1 depicts the packets being classified by the end points 102 and 108, packets may be classified by any network devices—whether end systems, edge nodes, or cored nodes. For example, unclassified packets may be received in the nodes 104 and/or 106 and the nodes 104 and/or 106 may be operable to classify the packets and mark the packets accordingly.

Figure 2:
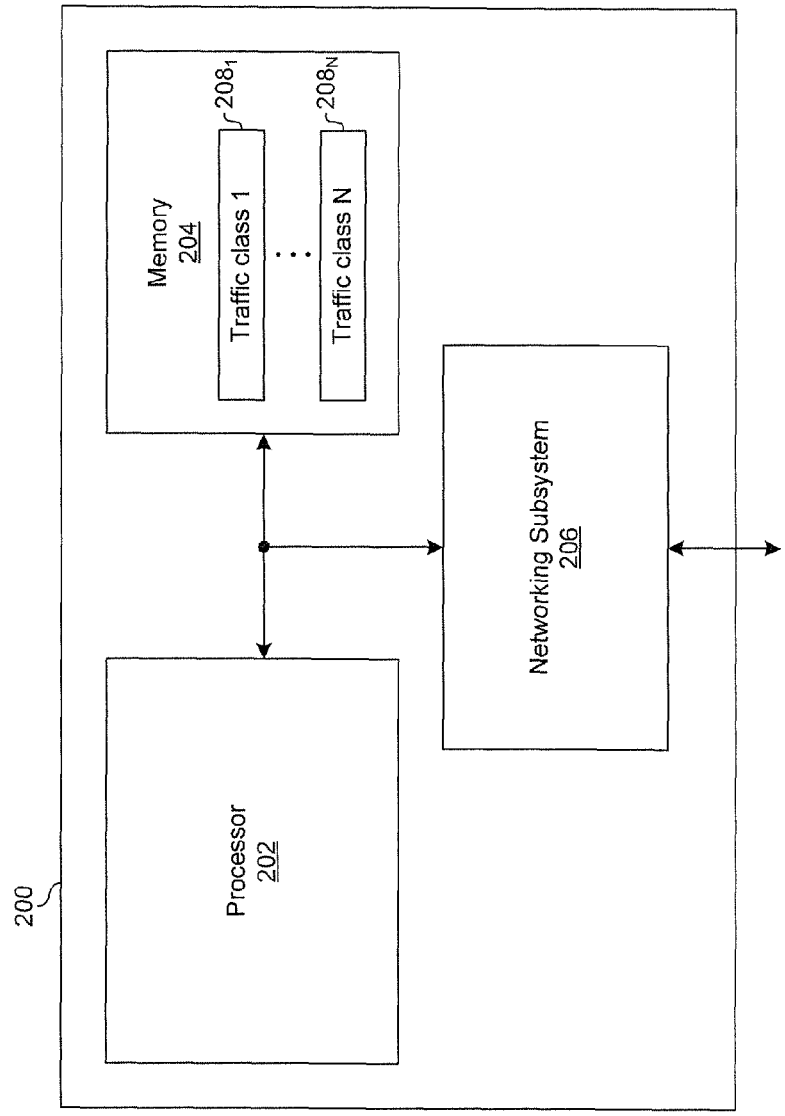
FIG. 2 is a block diagram of an exemplary network device operable to transmit and/or forward traffic based on an energy efficiency classification, in accordance with an embodiment of the invention.

FIG. 2 is a block diagram of an exemplary network device operable to transmit and/or forward traffic based on an energy efficiency classification, in accordance with an embodiment of the invention. Referring to FIG. 2 there is shown a network device 200 which may be similar to, or the same as, one or more of the devices 102, 104, 106, and 108 described with respect to FIG. 1. The network device 200 may comprise a processor 202, a memory 204, and a networking subsystem 206.

The processor 202 may comprise suitable logic, circuitry, and/or code that may enable processing data and/or controlling operations of the network device 200. With regard to processing data, the processor 202 may enable packetization, de-packetization, transcoding, reformatting, and/or otherwise processing data received from and/or to be transmitted by the networking subsystem 206. With regard to controlling operations of the network device 200, the processor 202 may be enabled to provide control signals to the various other portions of the network device 200. The processor 202 may also control data transfers between various portions of the network device 200. The processor 202 may enable execution of applications programs and/or code. In this regard, the applications, programs, and/or code may enable, for example, parsing, transcoding, or otherwise processing data. Furthermore, the applications, programs, and/or code may enable, for example, configuring or controlling operation of the networking subsystem 206, and/or the memory 204.

The memory 204 may comprise suitable logic, circuitry, and/or code that may enable storage or programming of information that includes parameters and/or code that may effectuate the operation of the network device 200. The parameters may comprise configuration data and the code may comprise operational code such as software and/or firmware, but the information need not be limited in this regard. Additionally, the parameters may include adaptive filter and/or block coefficients. Additionally, the memory 204 may buffer or otherwise store received data and/or data to be transmitted. In this regard, the memory 204 may comprise a plurality of queues $208_1, \ldots, 208_N$ for buffering packets to be transmitted, where N is an integer. In various embodiments of the invention, each of the queues 208 may buffer packets associated with one or more classifications. For example, there may be 2 queues $208_1$ and $208_2$; queue $208_1$ may buffer packets that may be transmitted without regard to energy consumption, and queue $208_2$ may buffer packets that may be transmitted in the most energy efficient manner possible. For another example, a queue 2081 may buffer packets classified as requiring low latency but tolerant of high energy consumption, a queue 2082 may buffer packets classified as requiring low energy consumption but tolerant of long latency, and a queue 2083 may buffer packets that may require only moderately low latency and may tolerate moderate energy consumption.

The networking subsystem 206 may comprise suitable logic, circuitry, and/or code that may be operable to transmit and receive data in adherence to one or more networking standards. The networking subsystem 206 may be operable to transmit and/or receive data via, for example, a T1/E1 line, a passive optical network, DSL, a cable television infrastructure, a satellite broadband internet connection, a satellite television infrastructure, a cellular network, Bluetooth, wireless Ethernet, WiMAX, and/or wired Ethernet. The networking subsystem 206 may be operable to implement, switching, routing, and/or network interface card (NIC) functions. In this regard, the networking subsystem 206 may implement physical layer functions, data link layer functions, and may even implement functions associated with OSI layer 3 and higher OSI layers.

Figure 3A:
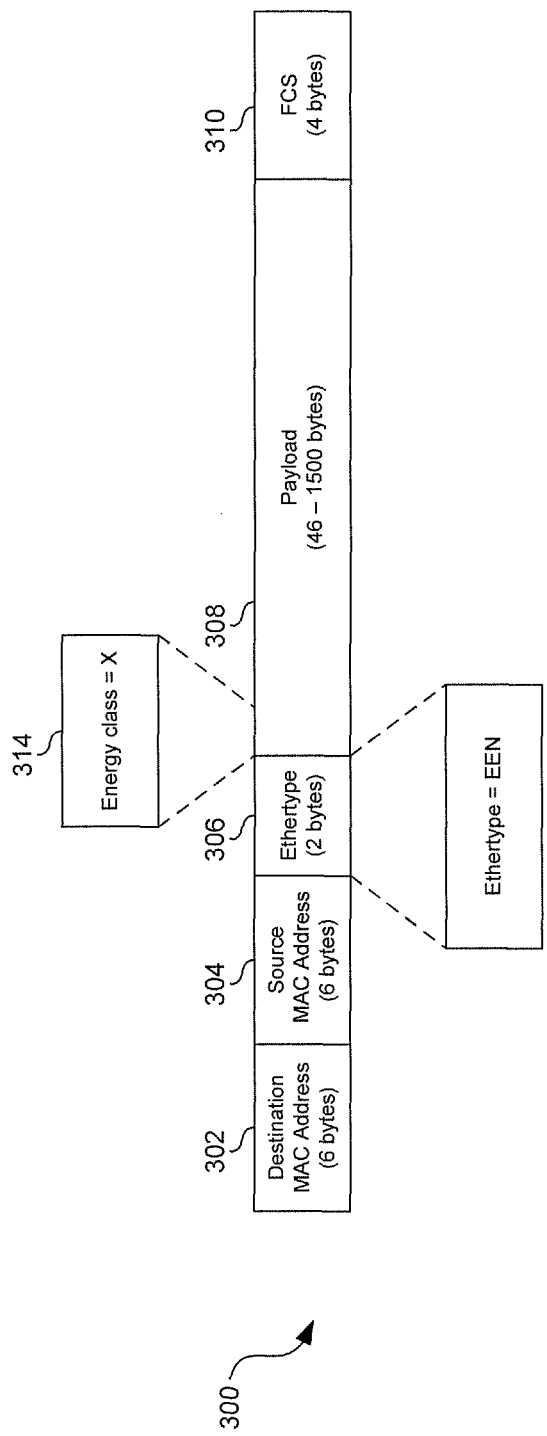
FIGS. 3A-3C illustrate exemplary packets marked for energy-efficiency-based forwarding, in accordance with an embodiment of the invention.
Figure 3B:
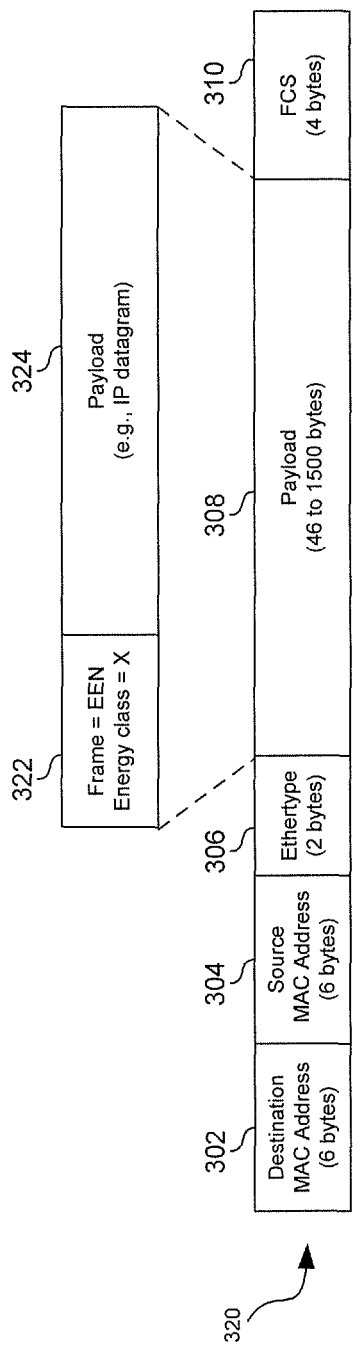
Figure 3C:
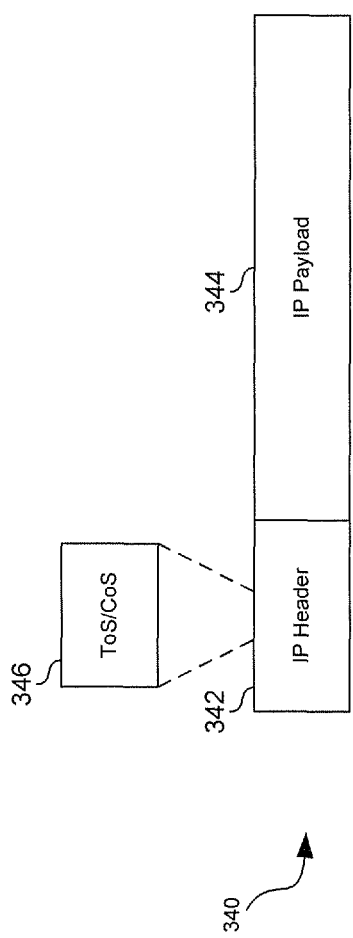

In operation, the network device 200 may be operable to generate packets and classify the packets based on desired energy expended in communicating the packets as well as other criteria such as latency, QoS, and packet jitter. The packets may be marked by the network device 200 to indicate the classifications of the packets, and the packets may accordingly be buffered in a queue $208_X$, where X is an integer between 1 and N and each of the N queues is associated with one or more classifications. In some embodiments of the invention, the packets may be marked to indicate classifications. For example, with regard to energy efficiency class, the packets may, for example, be marked as shown in FIGS. 3A-3C. In other embodiments of the invention, the network device 200 may be operable to classify the packets, and route/forward the packet accordingly, based on packet inspection or deep packet inspection.

Alternatively or additionally, the network device 200 may be operable to receive packets, and inspect the packets to determine one or more classifications of the packet. In inspecting the packets, the network device 200 may determine the energy efficiency class and/or other classifications of each packet by detecting one or more tags, fields, or other marking of the packet. With regard to energy efficiency class, the packets may, for example, be marked as shown in FIGS. 3A-3C. The network device 200 may be operable to determine how, where, and when to forward each received packet based, on the energy efficiency class and/or other classifications of each packet. Based on the determination, each packet may be buffered in an appropriate queue 208 and subsequently forwarded onto a path that most optimally meets the classifications of the packet.

In an exemplary embodiment of the invention, the network device 200 may comprise a battery powered device such as a laptop or wireless handset. Accordingly, communicating of information to and/or from the wireless device 200 utilizing two or more energy efficiency classes may enable optimizing battery life. An energy efficiency class associated with a particular type of traffic may depend on the remaining battery life. Also, a wireless communication protocol utilized for transmitting and/or receiving information in the network device 200 may depend on an energy efficiency class associated with the traffic. For example, data associated with a first energy efficiency class may be deferred until a low(er) energy connection to become available. This may include waiting for a stronger cellular signal, or waiting for another protocol, such as Bluetooth, to become available.

FIGS. 3A-3C illustrate exemplary packets marked for energy-efficiency-based forwarding, in accordance with an embodiment of the invention.

Referring to FIG. 3A, there is shown an Ethernet frame 300 comprising a destination MAC address field 302, a source MAC address field 304, an Ethertype field 306, a payload 308, and a frame check sequence (FCS) 310.

The destination MAC address field 302 may comprise information that may be utilized to identify the node that the packet is to be sent to. The source MAC address 304 field may comprise information that may be utilized to identify the node that originated the packet. The payload 308 may contain the data being transmitted.

The Ethertype field 306 may be utilized to identify the type and/or nature of the data which comprises the payload 308. In this regard, a distinct Ethertype may be defined to indicate an energy efficiency class to which the frame 300 is assigned. In some embodiments of the invention, a value in the Ethertype field 306 may be sufficient to determine an energy efficiency class associated with the frame 300. In other embodiments of the invention, the frame 300 may comprise a field 314 that indicates the energy efficiency class of the frame 300.

In operation, a device, such as the network device 200 of FIG. 2, may generate the Ethernet frame 300 and may set a value of one or both of the Ethertype field 312 and the field 314 to indicate an energy efficiency class of the frame 300. After the source device transmits the frame 300 into a network, the Ethernet frame 300 may be received by a second network device similar to or the same as the network device 200. The second networking device may parse the frame 300 and determine whether the frame is marked as belonging to an energy efficiency class, and if so, determine the energy efficiency class to which the frame 320 is assigned. In some embodiments of the invention, the EEN Ethertype may sufficiently identify the energy efficiency class. In other embodiments of the invention, the network device 200 may further parse the frame 300 to detect whether a field 314 is present, and if so, to determine the value of the field 314. After determining any energy efficiency class of the frame 300, the frame 300 may then be buffered in an appropriate queue and await transmission.

Referring to FIG. 3B, there is shown an Ethernet frame 300 comprising the destination MAC address field 302, the source MAC address field 304, the Ethertype field 306, a payload 308, and the frame check sequence (FCS) 310.

The payload 308 of the frame 320 may comprise a field 322 that is pre-pended to the conventional payload 324. The presence of the field 322 may indicate that the frame has been classified as belonging to an energy efficiency class. The value of the field 322 may indicate an energy efficiency class to which the frame 320 is assigned. In an exemplary embodiment of the invention, the field 322 may be a single bit. In such an embodiment of the invention, the field 322 being asserted may indicate that the frame 320 may be communicated based on energy consumption, and the bit being de-asserted may indicate that the frame 320 may be communicated without concern for energy consumption. In other embodiments of the invention, more energy efficiency classes may be used and the field 324 may accordingly comprise more than a single bit.

In operation, a device, such as the device 200, may generate the Ethernet frame 320 and may insert the field 322 to indicate an energy efficiency class associated with the frame 320. After the source device transmits the frame 320 into a network, the Ethernet frame 300 may be received by a second network device similar to or the same as the network device 200. The second network device may parse the frame 320 to determine whether the field 322 is present, and if so, an energy efficiency class of the frame 320. After determining the energy efficiency class of the frame 320, the frame 320 may be buffered in an appropriate queue and await transmission.

Referring to FIG. 3C, there is shown an IP datagram comprising a header 342 and a payload 344. The header 342 may comprise a type of service/class of service (ToS/CoS) field 346. One or more bits of the ToS/CoS field 346 may indicate an energy efficiency class associated with the IP datagram 342. In various embodiments of the invention, the value of the ToS/CoS field 346 may be mapped to an energy efficiency class via one or more functions and/or via a look-up table or similar data structure.

In operation, a device, such as the device 200, may generate the IP datagram 342 and may set the value of the ToS/CoS field 346 to indicate the energy efficiency class of the IP datagram 342. After the source device transmits the frame 340 into a network, the IP datagram 342 may be received by a second network device similar to or the same as the network device 200. The second network device may parse the IP datagram 340 and, based on a value of the ToS/CoS field 344, the receiving device may determine which energy efficiency class, if any, the IP datagram 340 is assigned to. In some embodiments of the invention, the ToS/CoS field 346 may be mapped into an energy efficiency class via, for example, a hash function and/or look-up table. After determining the energy efficiency class, the IP datagram 340 may then be buffered in an appropriate queue and await transmission.

Figure 4A:
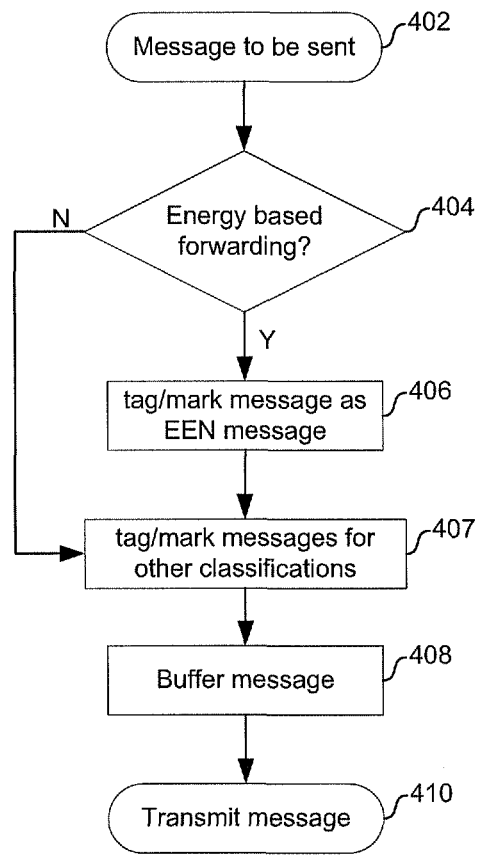
FIG. 4A is a flow chart illustrating exemplary steps for generating packets that are forwarded based on energy efficiency and/or other packet classifications, in accordance with an embodiment of the invention.

FIG. 4A is a flow chart illustrating exemplary steps for generating packets that are forwarded based on energy efficiency and/or other packet classifications, in accordance with an embodiment of the invention. Referring to FIG. 4A, the exemplary steps may begin with step 402 when a network device, such as the network device 200, has a packet to communicate to a remote device over a network. Subsequent to step 402, the exemplary steps may advance to step 404.

In step 404, it may be determined whether communication of the packet across a network may be based on energy consumption. In some embodiments of the invention, the determination may be based on the application generating the packet, the type of packet, the priority of the packet, and/or an amount of latency that may be tolerated by the packet. For example, applications that generate time-sensitive traffic, such as multimedia streams, may be less likely to be marked for communication based on energy consumption. In some embodiments of the invention, the type, battery level, or configuration of the network device generating the packet, and/or the type, battery level, or configuration of the network device for which the packet is destined may determine an energy efficiency class to which data is assigned. For example, a device that runs on battery power may prefer to transmit and/or receive packets via a low(er) energy path such as a wired Ethernet, as opposed to a high(er) energy path such as a wireless connection. In instances that the packet is to be forward based on energy consumption, the exemplary steps may advance to step 406.

In step 406, the packet may be marked for energy-efficiency-based forwarding. In this regard, the packet may be marked as described in one or more of FIGS. 3A-3C. Subsequent to step 406, the exemplary steps may advance to step 407.

In step 407, the packet may be marked to indicate other classifications. In this regard, energy efficiency along with other criteria may be utilized in determining an optimal path for the packet.

In step 408, the packet may be buffered and await transmission. In this regard, a queue in which the packet is buffered may depend an energy efficiency class to which the packet is assigned and/or on other classifications of the packet. Subsequent to step 406, the exemplary steps may advance to step 410.

In step 410, the packet may be transmitted. A link onto which the packet is transmitted may be determined by the energy efficiency class and/or other classifications of the packet.

Returning to step 404, in instances that the packet is not to be forward based on energy consumption, the exemplary steps may advance to the previously described step 408.

Figure 4B:
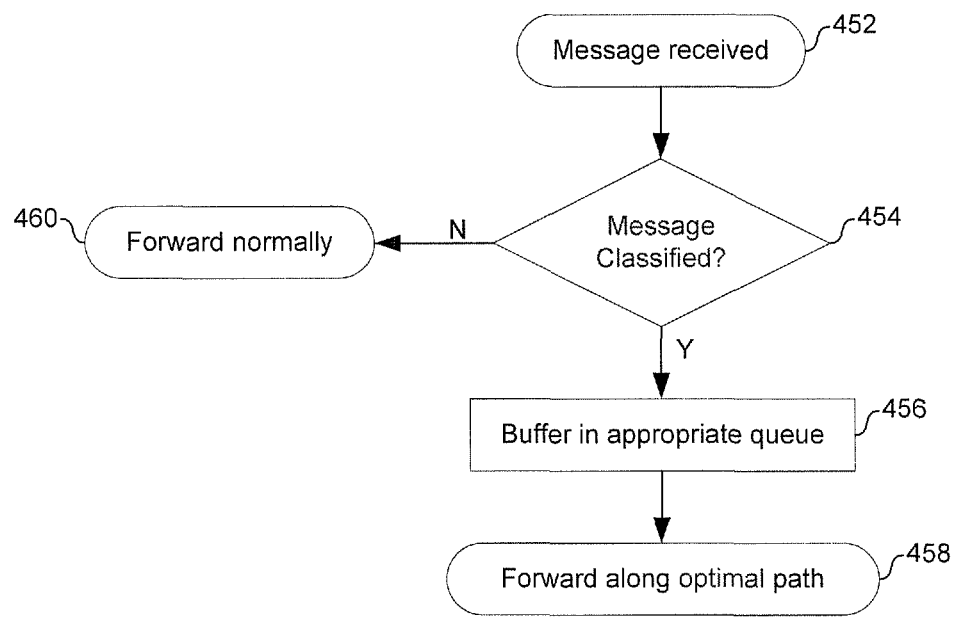
FIG. 4B is a flow chart illustrating forwarding of packets classified based on energy efficiency and/or other criteria, in accordance with an embodiment of the invention.

FIG. 4B is a flow chart illustrating forwarding of packets classified based on energy efficiency and/or other criteria, in accordance with an embodiment of the invention. Referring to FIG. 4B, the exemplary steps may begin with step 452 when a packet is received by a network device such as the network device 200. Subsequent to step 452 the exemplary steps may advance to step 454.

In step 454 it may be determined whether the packet is classified based on one or more criteria. In this regard, the packet may be parsed to determine whether it is marked for, for example, energy-efficiency-based forwarding. In instances that the packet is marked, the packet may be parsed to determine the classifications of the packet. In instances that the packet is not classified, the exemplary steps may advance to step 460. In step 460, the packet may be forwarded according to, for example, default criteria.

Returning to step 454, in instances that the packet is classified according to one or more criteria, the exemplary steps may advance to step 456. In step 456, the packet may be buffered based on an energy efficiency class to which the packet is assigned and/or based on other classifications of the packet. Subsequent to step 456, the exemplary steps may advance to step 458. In step 458, the packet may be transmitted onto a network path that most optimally meets the one or more classifications of the packet.

Aspects of a method and system for energy-efficiency-based packet classification are provided. In an exemplary embodiment of the invention, a network link 112 for communicating a packet 105 or 107 may be selected based, at least in part, on an amount of energy required to communicate the packet over the network link 112, and based, at least in part, on an energy efficiency class to which the packet 105 or 107 is assigned. A time at which to transmit the packet 105 or 107 over a link 112 may be determined based on an amount of energy required to communicate the packet over the network link 112. Transmission of the packet 105 or 107 may be deferred until the selected network link 112 transitions to a low or lower energy mode of operation. Transmission of the packet 105 or 107 may be deferred until the selected network link 112 is available for communication of the packet. The energy efficiency class may be determined based on one or more fields of the packet, wherein the fields may comprise one or more of an Ethertype field 306, a type of service header 346 of an IP datagram 340, and a field 314 or 322 pre-pended or appended to a payload 308 or 324 of the packet. In this regard, during or subsequent to generation of the packet 105 or 107, the packet may be marked such that a network path 156 or 160 traversed by the generated packet 105 or 107 may be determined based on the energy required to communicate the packet 105 or 107 over the network path 156 or 160.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for energy-efficiency-based packet classification.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   performing, by one or more circuits and/or processors in a first network device:
   selecting a network link for communicating a received packet based, at least in part, on an indicator used to mark said received packet, said indicator being used by said first network device to identify an energy efficiency class to which said received packet is assigned, wherein said indicator is included in one or more fields of said received packet, wherein said fields comprise one or more of an Ethertype field, a type of service header of an IP datagram, and a field pre-pended or appended to a payload of said packet; and
   transmitting said packet via said selected network link.

2. The method according to claim 1, comprising determining when to transmit said packet based on an amount of energy required to communicate said packet over said network link, wherein said network link is a wired network link.

3. The method according to 1, comprising deferring transmission of said packet until said selected link transitions to a lower energy mode of operation.

4. The method according to 1, comprising deferring transmission of said packet until said selected link is available for communication of said packet.

5. A method for networking, the method comprising:
   performing, by one or more circuits or processors in a first network device:
   generating a packet;
   marking said generated packet with an indicator of an energy efficiency class associated with said generated packet,
   wherein said marking said generated packet indicates to a second network device that a network path to be traversed by said marked generated packet is to be determined based, at least in part, on an energy efficiency as indicated by said indicator included within one or more fields of said packet, wherein said fields comprise one or more of an Ethertype field, a type of service header of an IP datagram, and a field pre-pended or appended to a payload of said packet; and
   transmitting said marked packet onto a first link of said network path.

6. The method according to claim 5, comprising determining when to transmit said marked packet based on an amount of energy required to communicate said packet over said network path.

7. The method according to 5, comprising deferring transmission of said packet until one or more links of said network path transition to a lower energy mode of operation.

8. The method according to 5, comprising deferring transmission of said packet until one or more links of said network path are available for communication of said packet.

9. A system for networking, the system comprising:
   one or more circuits for use in a first network device, wherein said one or more circuits are operable to:
   select a network link for communicating a received packet based, at least in part, on an indicator used to mark said received packet, said indicator being used by said first network device to identify an energy efficiency class to which said packet is assigned, wherein said indicator included in on or more fields of said received packet, wherein said fields comprise one or more of an Ethertype field, a type of service header of an IP datagram, and a field pre-pended or appended to a payload of said packet; and
   transmit said packet via said selected network link.

10. The system according to claim 9, wherein said one or more circuits are operable to determine when to transmit said packet based on an amount of energy required to communicate said packet over said network link.

11. The system according to 9, wherein said one or more circuits are operable to defer transmission of said packet until said selected link transitions to a lower energy mode of operation.

12. The system according to 9, wherein said one or more circuits are operable to defer transmission of said packet until said selected link is available for communication of said packet.

13. A system for networking, the system comprising:
one or more circuits for use in a first network device, wherein said one or more circuits are operable to:
generate a packet;
mark said generated packet with an indicator of an energy efficiency class associated with said generated packet,
wherein said marking said generated packet indicates to a second network device that a network path to be traversed by said marked generated packet is to be determined based, at least in part, on an energy efficiency as indicated by said indicator included within one or more fields of said packet, wherein said fields comprise one or more of an Ethertype field, a type of service header of an IP datagram, and a field prepended or appended to a payload of said packet; and
transmit said marked packet onto a first link of said network path.

14. The system according to claim 13, wherein said one or more circuits are operable to determine when to transmit said marked packet based on an amount of energy required to communicate said packet over said network path.

15. The system according to 13, wherein said one or more circuits are operable to defer transmission of said packet until one or more links of said network path transition to a lower energy mode of operation.

16. The method according to 13, wherein said one or more circuits are operable to defer transmission of said packet until one or more links of said network path are available for communication of said packet.

* * * * *

UNITED STATES PATENT AND TRADEMARK OFFICE
CERTIFICATE OF CORRECTION

| | |
|---|---|
| PATENT NO. | : 8,416,774 B2 |
| APPLICATION NO. | : 12/483952 |
| DATED | : April 9, 2013 |
| INVENTOR(S) | : Wael William Diab |

Page 1 of 1

It is certified that error appears in the above-identified patent and that said Letters Patent is hereby corrected as shown below:

In the Claims:

Col. 10, line 58, replace "on" with --one--.

Signed and Sealed this
Eleventh Day of June, 2013

Teresa Stanek Rea
*Acting Director of the United States Patent and Trademark Office*